US008599288B2

(12) United States Patent
Oishi

(10) Patent No.: US 8,599,288 B2
(45) Date of Patent: Dec. 3, 2013

(54) NOISE REDUCTION APPARATUS, METHOD AND COMPUTER-READABLE RECORDING MEDIUM

(75) Inventor: Makoto Oishi, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 1107 days.

(21) Appl. No.: 12/112,511

(22) Filed: Apr. 30, 2008

(65) Prior Publication Data

US 2008/0273100 A1   Nov. 6, 2008

(30) Foreign Application Priority Data

May 1, 2007   (JP) .................................. 2007-120622

(51) Int. Cl.
*H04N 5/217*   (2011.01)

(52) U.S. Cl.
USPC ......................................................... 348/241

(58) Field of Classification Search
USPC .......... 348/241–252, 271–273, 255; 382/272, 382/162, 164
See application file for complete search history.

(56) References Cited

U.S. PATENT DOCUMENTS

| | | | |
|---|---|---|---|
| 6,697,107 B1 * | 2/2004 | Hamilton et al. | 348/234 |
| 7,564,490 B2 * | 7/2009 | Ooishi | 348/241 |
| 7,656,442 B2 * | 2/2010 | Tsuruoka | 348/241 |
| 2005/0099515 A1 | 5/2005 | Tsuruoka | |
| 2006/0039039 A1 * | 2/2006 | Ooishi | 358/463 |
| 2006/0066736 A1 * | 3/2006 | Tsuruoka | 348/241 |

* cited by examiner

*Primary Examiner* — James M Hannett
*Assistant Examiner* — Ahmed A Berhan
(74) *Attorney, Agent, or Firm* — Birch, Stewart, Kolasch & Birch, LLP

(57) ABSTRACT

A noise-reduction apparatus includes an image-noise-reduction means having an operation means and a judgment means. The operation means shifts the level of the signal-value of a target-pixel so that an average of the signal-values of the target-pixel and pixels in a predetermined area in the vicinity of the target-pixel becomes a value at the origin of a color-space of each of a plurality of color-components, performs an operation for noise-reduction processing on the target-pixel and restores the level of the signal-value thereof based on the shifted level. The judgment means estimates a noise-amount of the target-pixel, calculates a statistic representing the noise of the target-pixel based on the signal-values of the target-pixel and the pixels in the predetermined area, compares the estimated noise-amount and the statistic, and determines, based on the result of comparison, which of the estimated noise-amount and the statistic to use for the operation of noise-reduction processing.

19 Claims, 9 Drawing Sheets

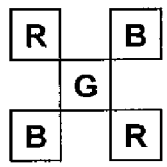 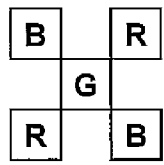 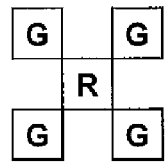 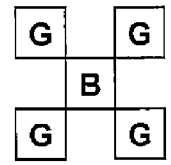
FIG.7A  FIG.7B  FIG.7C  FIG.7D
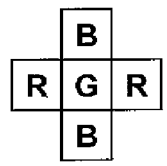 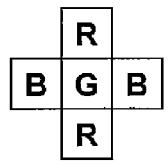 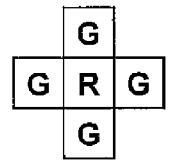 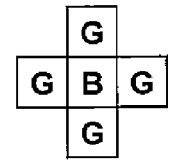
FIG.8A  FIG.8B  FIG.8C  FIG.8D
FIG.9
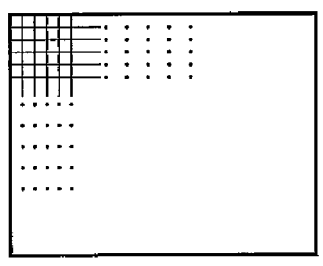
CCD-RAW
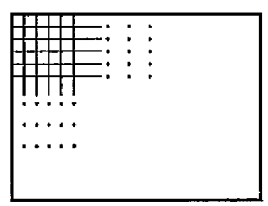
RL
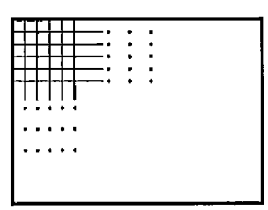
BL
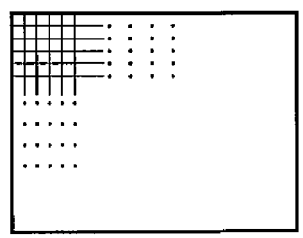
GL

FIG.11A

| GL | GL | GL | GL | GL | GL | GL | GL | GL |
|----|----|----|----|----|----|----|----|----|
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |

| MG | GL | GL | GL | GL | GL | GL | GL | GL |
|----|----|----|----|----|----|----|----|----|
| MG | MG | MG | MG | GL | GL | GL | GL | GL |
| MG | MG | MG | MG | GL | GL | GL | GL | GL |
| MG | MG | MG | MG | MG | GL | GL | GL | GL |
| MG | MG | MG | MG | MG | MG | GL | GL | GL |
| MG | MG | MG | MG | MG | MG | MG | MG | MG |
| MG | MG | MG | MG | MG | MG | MG | MG | MG |
| MG | MG | MG | MG | MG | MG | MG | MG | MG |
| MG | MG | MG | MG | MG | MG | MG | MG | MG |

— BA

NOISE REDUCTION APPARATUS, METHOD AND COMPUTER-READABLE RECORDING MEDIUM

BACKGROUND OF THE INVENTION

1. Field of the Invention

The present invention relates to a noise reduction apparatus and method for reducing noise in an image. Further, the present invention relates to a program for causing a computer to execute the noise reduction method and a computer-readable recording medium having stored thereon the program.

2. Description of the Related Art

The numbers of pixels and the sensitivities of CCD's, which are used in digital cameras and the like, have become higher. As the sensitivities of the CCD's have become higher, the influence of noise contained in images obtained by imaging has become a problem. Therefore, various kinds of techniques have been proposed to reduce the noise contained in the images. For example, the amount of noise (noise amount) in each pixel of an image and an imaging condition are estimated, and the estimated amount of noise is corrected based on the imaging condition, and noise in the image is reduced based on the corrected amount of noise (please refer to U.S. Patent Application Publication No. 20050099515). Further, in another method, CCD-RAW data that has been output from a CCD is divided into color components of R, G and B, and noise reduction processing is performed while correlation among the color components is maintained (please refer to U.S. Patent Application Publication No. 20060039039).

Further, in the method disclosed in U.S. Patent Application Publication No. 20060039039, the level of the signal value of a target pixel, which is a target of processing in the image, is shifted so that an average value of the signal value of the target pixel and the signal values of pixels in a predetermined area in the vicinity of the target pixel becomes a value at the origin of a color space of each of a plurality of color components. Then, an operation for noise reduction processing is performed on the target pixel, the level of the signal value of which has been shifted, based on a statistic representing the noise amount of the target pixel. Then, the level of the signal value of the target pixel, the noise of which has been reduced, is restored based on the amount of the level that has been shifted.

However, in the method disclosed in U.S. Patent Application Publication No. 20060039039, the statistic representing the noise of the target pixel is calculated based on the signal value of the target pixel and the signal values of the pixels in the predetermined area in the vicinity of the target pixel, and the operation for noise reduction is performed by using the statistic. Therefore, when the sensitivity of imaging becomes higher and the amount of noise increases, the effect of noise reduction may become too strong and edges and fine patterns included in the image may become blurred (unsharp).

SUMMARY OF THE INVENTION

In view of the foregoing circumstances, it is an object of the present invention to make it possible to perform more appropriate noise reduction processing particularly when the amount of noise contained in an image is large.

A noise reduction apparatus according to the present invention is a noise reduction apparatus comprising:

an image noise reduction means for reducing noise in an image, wherein the image noise reduction means includes an operation means and a judgment means, and wherein the operation means shifts the level of the signal value of a target pixel, which is a target of processing in the image, so that an average value of the signal value of the target pixel and the signal values of pixels in a predetermined area in the vicinity of the target pixel becomes a value at the origin of a color space of each of a plurality of color components, performs an operation for noise reduction processing on the target pixel, the level of the signal value of which has been shifted, and restores the level of the signal value of the target pixel, the noise of which has been reduced, based on the amount of the shifted level, and wherein the judgment means estimates a noise amount of the target pixel, calculates a statistic representing the noise of the target pixel based on the signal value of the target pixel and the signal values of the pixels in the predetermined area, compares the estimated noise amount and the statistic with each other, and determines, based on the result of comparison, which of the estimated noise amount and the statistic to use to perform the operation for noise reduction processing.

Further, in the noise reduction apparatus according to the present invention, the average value may be an average value of the signal values of pixels that have been classified, based on a result of comparison between the signal value of the target pixel and the signal values of the pixels in the predetermined area in the vicinity of the target pixel, into a group of pixels, a change in the signal values of which is relatively small.

A noise reduction method according to the present invention is a noise reduction method for reducing noise in an image, the method comprising:

shifting the level of the signal value of a target pixel, which is a target of processing in the image, so that an average value of the signal value of the target pixel and the signal values of pixels in a predetermined area in the vicinity of the target pixel becomes a value at the origin of a color space of each of a plurality of color components;

performing an operation for noise reduction processing on the target pixel, the level of the signal value of which has been shifted; and restoring the level of the signal value of the target pixel, the noise of which has been reduced, based on the amount of the shifted level, wherein when these steps are performed, a noise amount of the target pixel is estimated, a statistic representing the noise of the target pixel is calculated based on the signal value of the target pixel and the signal values of the pixels in the predetermined area, the estimated noise amount and the statistic are compared with each other, and which of the estimated noise amount and the statistic to use to perform the operation for noise reduction processing is determined based on the result of comparison.

Further, the noise reduction method according to the present invention may be provided as a program for causing a computer to execute the noise reduction method. Further, the noise reduction method according to the present invention may be provided as a computer-readable recording medium having stored thereon the program.

According to the present invention, the level of the signal value of a target pixel, which is a target of processing in the image, is shifted so that an average value of the signal value of the target pixel and the signal values of pixels in a predetermined area in the vicinity of the target pixel becomes a value at the origin of a color space of each of a plurality of color components. Further, an operation for noise reduction processing is performed on the target pixel, the level of the signal value of which has been shifted. Further, the level of the signal value of the target pixel, the noise of which has been reduced, is restored based on the amount of the shifted level. When these steps are performed, a noise amount of the target pixel is estimated, a statistic representing the noise of the target pixel is calculated based on the signal value of the target pixel and the signal values of the pixels in the predetermined area, the estimated noise amount and the statistic are compared with each other, and which of the estimated noise amount and the statistic to use to perform the operation for noise reduction processing is determined based on the result of comparison.

The estimated noise amount is obtained merely by estimating the amount of noise in the image. Meanwhile, the statistic is calculated based on an actual signal value. Therefore, the estimated noise amount and the statistic are not always the same. When an edge or a fine pattern is present in a predetermined area in the vicinity of a target pixel, the value of the statistic increases. Therefore, if the operation for noise reduction is performed by using only the statistic, the edge and the fine pattern may become blurred. Further, when the estimated noise amount and the statistic are substantially the same, it is possible to more appropriately reduce the noise amount by using the actually measured statistic.

In the present invention, which of the estimated noise amount and the statistic to use to perform the operation for noise reduction processing is determined based on the result of comparison between the estimated noise amount and the statistic. Therefore, it is possible to appropriately reduce noise without blurring the edge and the fine pattern.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 2 is a diagram illustrating apart of the light receiving surface of a CCD (honeycomb arrangement);

FIG. 3 is a diagram illustrating a part of the light receiving surface of a CCD (Bayer arrangement);

FIG. 7A is a diagram for explaining pre-filtering processing on a CCD that has array structure of honeycomb arrangement;

FIG. 7B is a diagram for explaining pre-filtering processing on a CCD that has array structure of honeycomb arrangement;

FIG. 7C is a diagram for explaining pre-filtering processing on a CCD that has array structure of honeycomb arrangement;

FIG. 7D is a diagram for explaining pre-filtering processing on a CCD that has array structure of honeycomb arrangement;

FIG. 8A is a diagram for explaining pre-filtering processing on a CCD that has array structure of Bayer arrangement;

FIG. 5B is a diagram for explaining pre-filtering processing on a CCD that has array structure of Bayer arrangement;

FIG. 8C is a diagram for explaining pre-filtering processing on a CCD that has array structure of Bayer arrangement;

FIG. 8D is a diagram for explaining pre-filtering processing on a CCD that has array structure of Bayer arrangement;

FIG. 9 is a diagram for explaining processing for dividing data into color components;

FIG. 11A is a diagram for explaining the signal classification processing;

FIG. 11B is a diagram for explaining the signal classification processing; and

DESCRIPTION OF THE PREFERRED EMBODIMENTS

Figure 1:
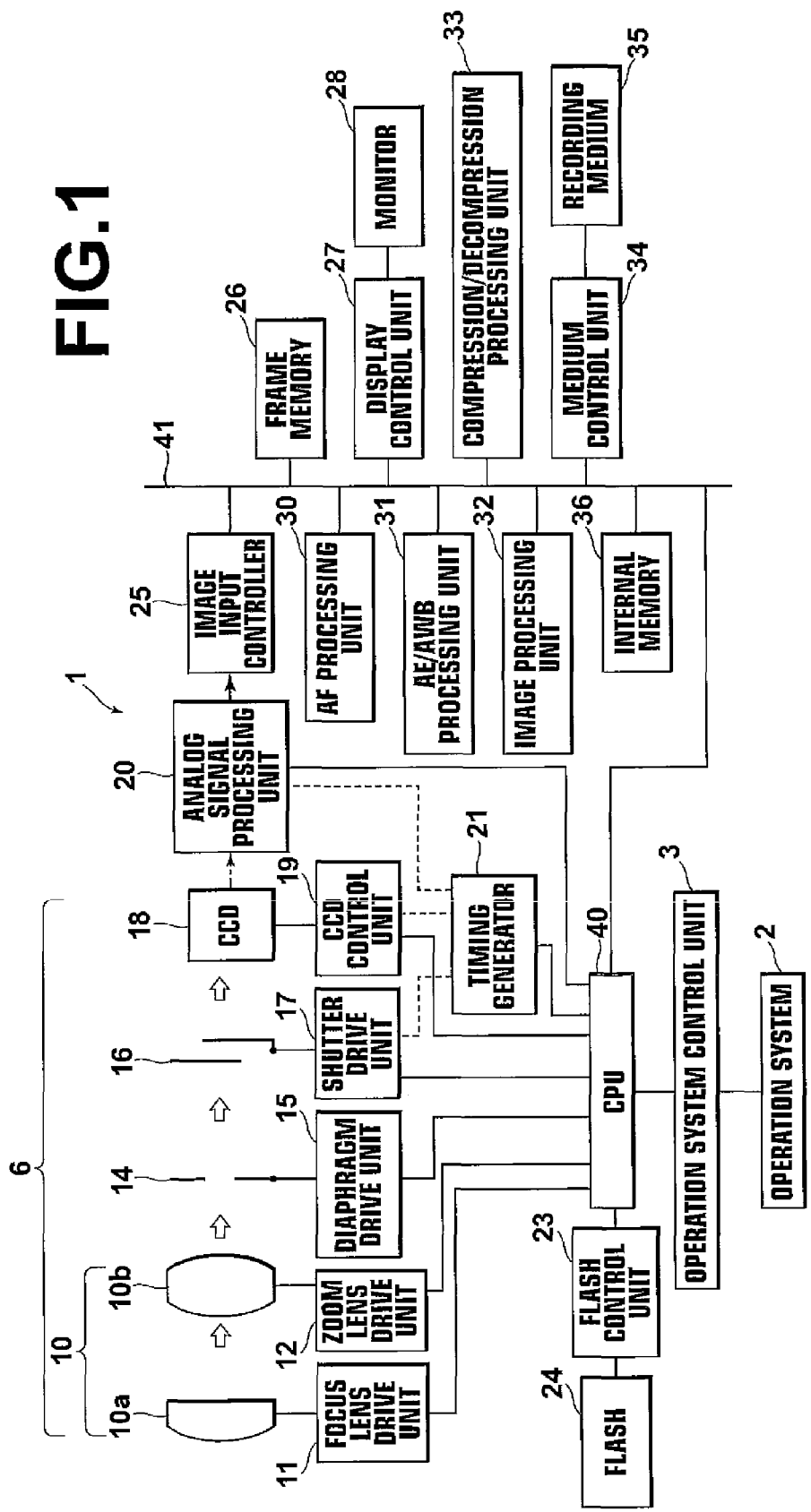
FIG. 1 is a schematic block diagram illustrating the configuration of a digital camera to which a noise reduction apparatus according to an embodiment of the present invention has been applied.

Hereinafter, embodiments of the present invention will be described with reference to the attached drawings. FIG. 1 is a schematic block diagram illustrating the configuration of a digital camera to which a noise reduction apparatus according to an embodiment of the present invention has been applied. As illustrated in FIG. 1, a digital camera 1 includes an operation system 2, such as an operation-mode switch, a zoom lever, up/down/right/left buttons, a release button and a power switch. Further, the digital camera 1 includes an operation system control unit 3, which is an interface for notifying a CPU (central processing unit) 40 of the content of operation by the operation system 2.

Further, the digital camera 1 includes an imaging system 6. The imaging system 6 includes a focus lens 10a and a zoom lens 10b, which form an imaging lens 10. The focus lens 10a and the zoom lens 10b can be moved in the direction of the optical axis of the digital camera 1 by a focus lens drive unit 11 and a zoom lens drive unit 12 respectively. Further, each of the focus lens drive unit 11 and the zoom lens drive unit 12 includes a motor and a motor driver. The focus lens drive unit 11 controls the movement of the focus lens 10a based on focus drive amount data that is output from an AF (automatic focus) processing unit 30. The zoom lens drive unit 12 controls the movement of the zoom lens 10b based on zoom lever operation amount data.

Further, a diaphragm 14 is driven by a diaphragm drive unit 15, which includes a motor and a motor driver. The diaphragm drive unit 15 adjusts the diameter of the aperture of the diaphragm 14 based on diaphragm value data that is output from an AE/AWB (automatic exposure/automatic white balance) processing unit 31.

A shutter 16 is a mechanical shutter that is driven by a shutter drive unit 17, which includes a motor and a motor driver. The shutter drive unit 17 controls open/close operation of the shutter 16 based on a signal that is generated when a release button is pressed and shutter speed data that is output from the AE/AWB processing unit 31.

Further, a CCD (charge coupled device) 18, which is an imaging device, is provided on the downstream-side (rear-side) of an optical system. The CCD 18 has a photoelectric plane (surface) in which a multiplicity of light receiving elements are two-dimensionally arranged. Light of a subject (light representing a subject) is transmitted through the optical system and imaged on the photoelectric plane. Then, photoelectric conversion is performed.

Figures 2, 3:
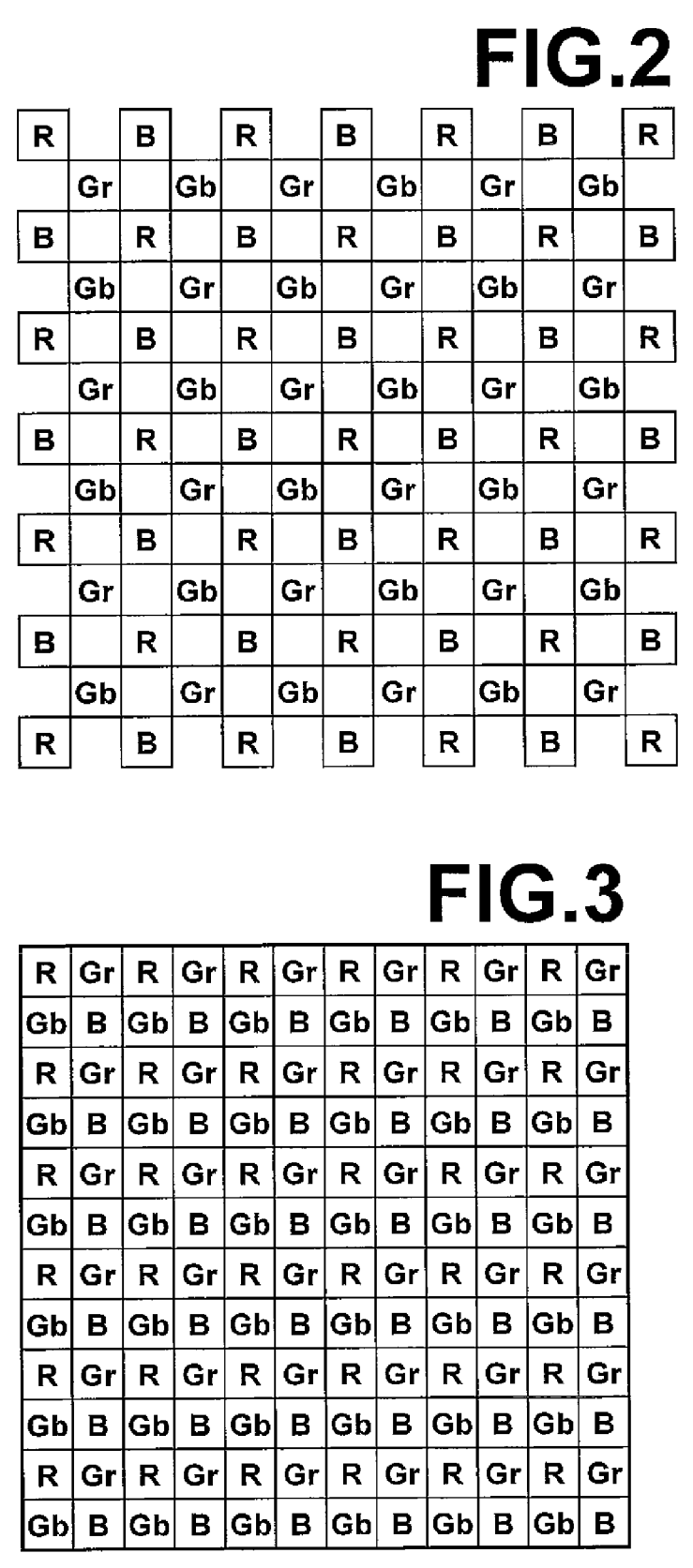

FIG. 2 is a diagram illustrating a part of the light receiving surface of the CCD 18. As illustrated in FIG. 2, the CCD 18 has array structure of honeycomb arrangement, in which light receiving elements are arranged in checker form. For example, 4096 light receiving elements are arranged in the column direction of the CCD 18 and 1540 light receiving elements are arranged in the row direction of the CCD 18. Therefore, if this CCD 18 is used to obtain an image of the subject, image data representing the image of the subject of 4096 pixels in the column direction and 1540 pixels in the row direction is obtained. A signal value obtained from each of the light receiving elements corresponds to the signal value of each pixel of the image.

Further, a color filter array is arranged on the light receiving surface of the CCD 18, which includes a multiplicity of light receiving elements. In the color filter array, color filters, each having one of R, G and B colors, are regularly arranged. As illustrated in FIG. 2, in the color filter array, color filters, each having a characteristic of passing (transmitting) one of a red color component (R color component), a blue color component (B color component), a first green color component and a second green color component (the first green color component and the second green color component may have the same characteristic: G color component), are arranged so as to correspond to the light receiving elements. In FIG. 2, letters "R", "B", "Gr" and "Gb" are assigned to filters that pass the red color component, filters that pass the blue color component, filters that pass the first green color component and filters that pass the second green color component, respectively.

Further, as illustrated in FIG. 2, filters that pass the red light component and filters that pass the blue light component are alternately formed in each of odd-number columns of light receiving elements on the light receiving surface. Further, in each of even-number columns of the light receiving elements on the light receiving surface, filters that pass the first green light component and filters that pass the second green light component are alternately formed.

It is not necessary that the light receiving elements of the CCD 18 have the array structure of honeycomb arrangement as illustrated in FIG. 2. Alternatively, a CCD that has array structure of Bayer arrangement, as illustrated in FIG. 3, may be used. In the array structure of Bayer arrangement, pixels are arranged in square form. In the CCD that has Bayer arrangement, as illustrated in FIG. 3, filters that pass the red light component and filters that pass the first green light component are alternately formed in each of odd-number columns of the light receiving elements on the light receiving surface. Further, in each of even-number columns of the light receiving elements on the light receiving surface, filters that pass the second green light component and filters that pass the blue light component are alternately formed.

The CCD 18 outputs charges, line by line, that have been stored in each of the light receiving elements as serial analog imaging signals. The CCD 18 outputs the charges in synchronization with a vertical transfer clock and a horizontal transfer clock provided by a CCD control unit 19. A time period of storing charges in each of the light receiving elements, in other words, an exposure time is determined by an electronic shutter drive signal provided by the CCD control unit 19. Further, the gain of the CCD 18 is adjusted by the CCD controller 19 so that a predetermined size of analog imaging signal is obtained.

The analog imaging signal obtained by using the CCD 18 is input to an analog signal processing unit 20. The analog signal processing unit 20 includes a correlated double sampling circuit (CDS), an automatic gain controller (AGC) and an A/D converter (ADC). The CDS removes noise from the analog signal, and the AGC adjusts the gain of the analog signal. The ADC converts the analog signal into a digital signal. The analog signal processing unit 20 performs analog signal processing. The image data that has been converted into the digital data is CCD-RAW data, which has density values of R, G and B for each pixel. Specifically, the CCD-RAW data includes sets of data that have color components corresponding to the color filters formed on the light receiving surface of the light receiving elements and the sets of data are serially generated line by line (row by row). Each pixel of a CCD-RAW image represented by the CCD-RAW data is represented by the signal value of one of a red color component, a blue color component, a first green color component and a second green color component. In other words, no signal value of any other color component is included. The signal values of other color components are interpolated in color interpolation processing, which will be described later.

A timing generator 21 generates a timing signal. The timing signal is provided for the shutter drive unit 17, the CCD control unit 19 and the analog signal processing unit 20 so that the operation of the release button, the open/close operation of the shutter 16, accumulation of charges in the CCD 18 and the processing by the analog signal processing unit 20 are synchronized with each other.

A flash control unit 23 makes a flash 24 output light at the time of photography.

An image input controller 25 writes the CCD-RAW data that has been input from the analog signal processing unit 20 in a frame memory 26.

The frame memory 26 is a memory for operation that is used when various kinds of image processing (signal processing), which will be described later, are performed on image data. For example, an SDRAM (synchronous dynamic random access memory), which transfers data in synchronization with a constant cycle of bus clock signals, is used as the frame memory 26.

The display control unit 27 displays image data stored in the frame memory 26 as a through image on a monitor 28. Further, the display control unit 27 displays image data stored in a recording medium 35 on the monitor 28 when the digital camera 1 is set to a regeneration mode.

The AF processing unit 30 and the AE/AWB processing unit 31 determine an imaging condition based on a so-called pre-image (preliminary image). When the release button is half pressed, a half press signal is generated. When the CPU 40 detects the half press signal, the CPU 40 causes the CCD 18 to carry out preliminary imaging and image data is stored in the frame memory 26. The preliminary image is represented by the image data stored in the frame memory 26.

The AF processing unit 30 detects a focus position based on the preliminary image and outputs focus drive amount data (AF processing). As a method for detecting the focus position, there is a passive method, for example. In the passive method, the focus position is detected by utilizing the characteristic that the contrast of an image becomes higher when a desired subject has been focused on.

The AE/AWB processing unit 31 measures the luminance of the subject based on the preliminary image and determines an ISO sensitivity, an aperture value, a shutter speed and the like based on the luminance of the subject obtained by measurement. Further, the AE/AWB processing unit 31 determines ISO sensitivity data, aperture value data and shutter speed data as exposure setting values (AE processing). Further, the AE/AWB processing unit 31 automatically adjusts white balance at the time of imaging (AWB processing).

Figure 4:
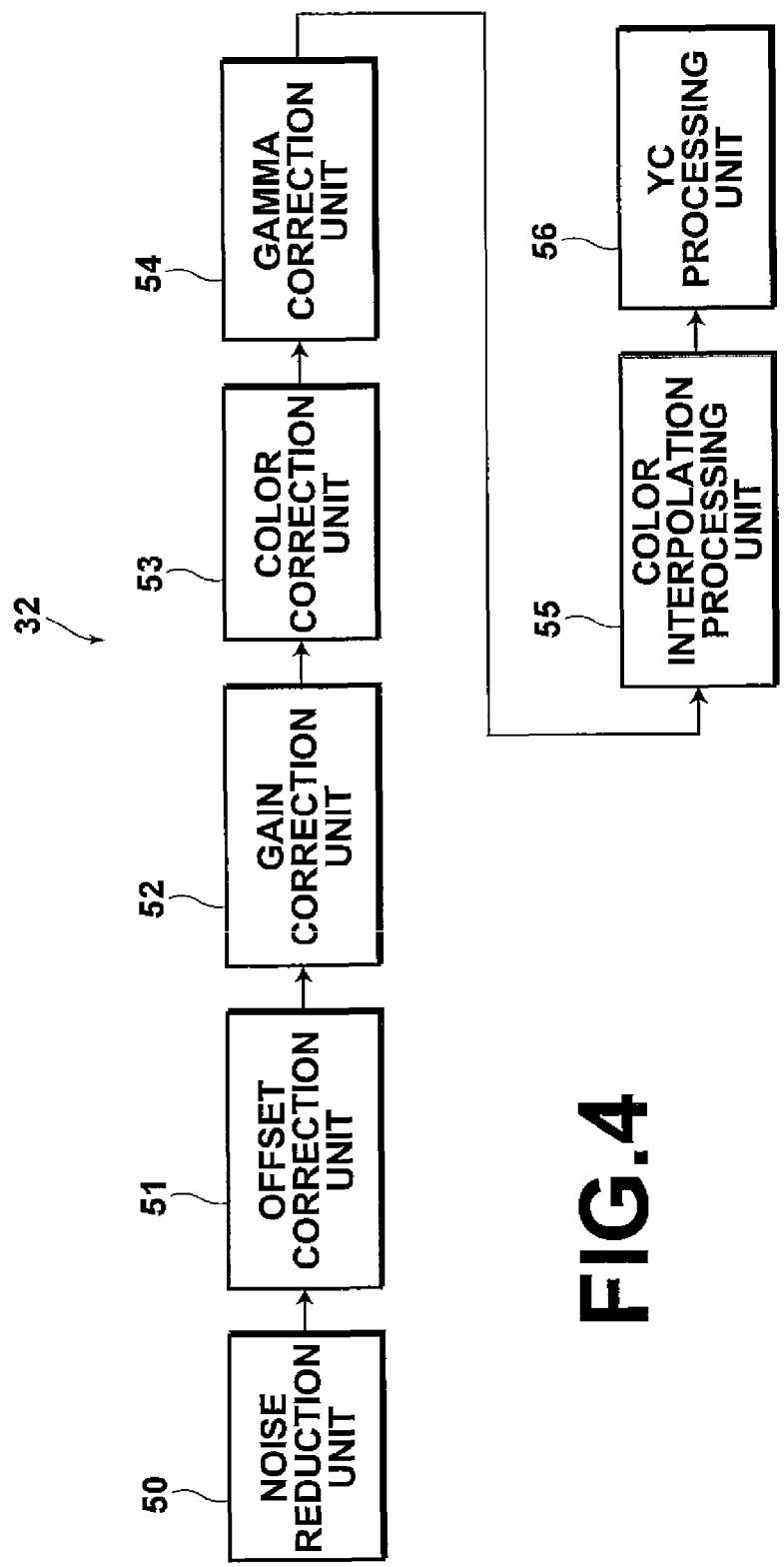
FIG. 4 is a block diagram illustrating the electrical structure of an image processing unit.

FIG. 4 is a block diagram illustrating the electrical structure of an image processing unit 32. As illustrated in FIG. 4, the image processing unit 32 includes a noise reduction unit 50, an offset correction unit 51, a gain correction unit 52, a color correction unit 53, a gamma correction unit 54 and a color interpolation unit 55. The noise reduction unit 50 performs noise reduction processing on CCD-RAW data of an actual image (a main image, which is not a preliminary image). Further, the offset correction unit 51 performs offset correction processing and the gain correction unit 52 performs gain correction processing. Further, the color correction unit 53 performs color correction processing and the gamma correction unit 54 performs gamma correction processing. Further, the color interpolation unit 55 performs color interpolation processing for interpolating each color component into the CCD-RAW data. Further, a YC processing unit 56 performs YC processing for converting the CCD-RAW data into which the color component has been interpolated into Y data and YC data. The Y data represents a luminance signal, and the YC data includes Cb data, which represents blue chrominance signal, and Cr data, which represents red chrominance signal.

The characteristic of the present embodiment lies in the processing performed by the noise reduction unit 50. The processing performed by the noise reduction unit 50 will be described later.

The actual image is an image represented by image data that has been obtained by the CCD 18 by actual imaging operation that is performed by fully pressing the release button. The actual image obtained by the CCD 18 is sent through the analog signal processing unit 20 and the image input controller 25 and stored in the frame memory 26.

A compression/decompression processing unit 33 performs compression processing on the CCD-RAW data of the actual image that has been processed by the image processing unit 32. The compression/decompression processing unit 33 uses a compression format, such as JPEG, for example, and generates an image file. Further, a tag is attached to the image file based on Exif format or the like. In the tag, supplementary information, such as photography date/time, is stored. Further, when the digital camera 1 is set to the regeneration mode, the compression/decompression processing unit 33 reads out a compressed image file from the recording medium 35 and performs decompression processing on the image file. When the image data is decompressed, the image data is output to the monitor 28. Accordingly, an image represented by the image data is displayed on the monitor 28.

A medium control unit 34 accesses the recording medium 35 and controls operations for writing an image file in the recording medium 35 and operations for reading out the image file from the recording medium 35.

In an internal memory 36, various kinds of constants to be set in the digital camera 1, a program executed by the CPU 40 and the like are stored.

The CPU 40 controls each unit in the main body of the digital camera 1 based on signals output from various processing units, such as the operation system 2 and the AF processing unit 30.

A data bus 41 is connected to various processing units, the frame memory 26, the CPU 40 and the like. The data bus 41 transmits digital image data, various kinds of instructions and the like.

The digital camera 1 of the present embodiment is configured as described above. In the digital camera 1, the image processing unit 32 performs image processing on the CCD-RAW data that has been obtained by the CCD 18 by imaging. Further, the compression/decompression processing unit 33 compresses the processed image data. Further, the medium control unit 34 records the compressed image data in the recording medium 35.

Figure 5:
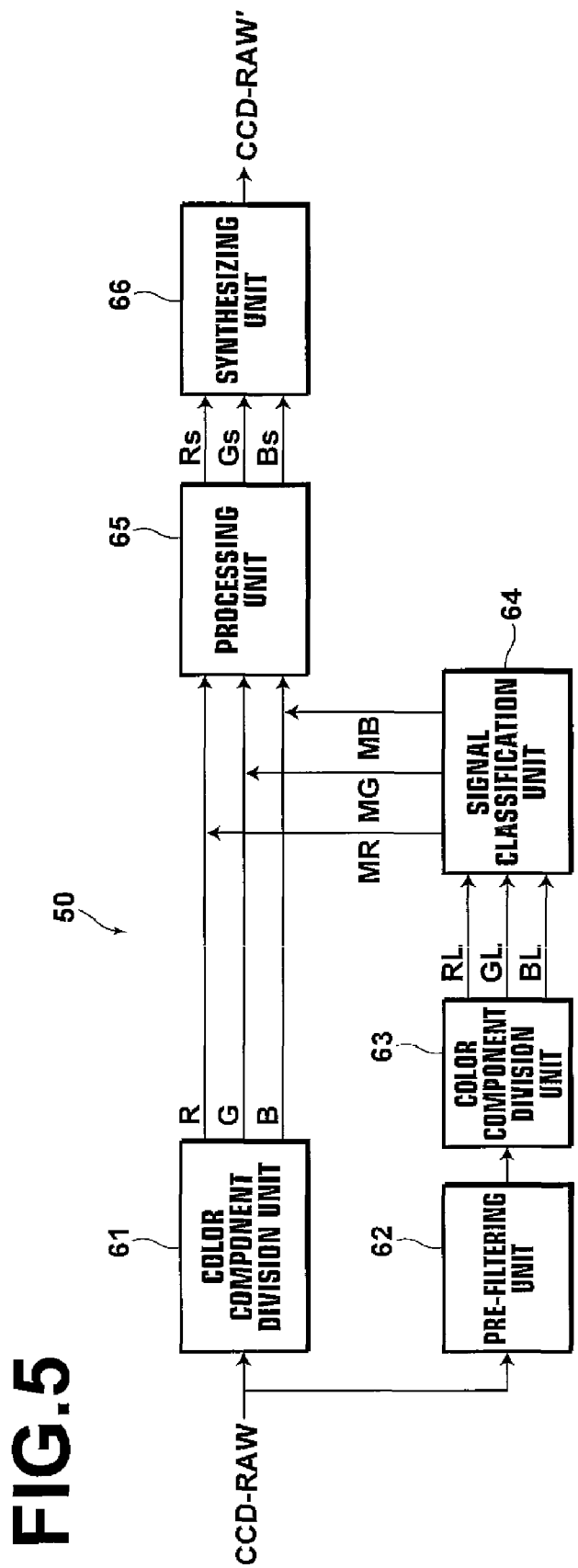
FIG. 5 is a schematic block diagram illustrating the configuration of a noise reduction unit in an embodiment of the present invention.

Next, noise reduction processing performed in the present embodiment will be described in detail. FIG. 5 is a schematic block diagram illustrating the configuration of the noise reduction unit 50 in an embodiment of the present invention. In the present embodiment, the green color component of the color components of the CCD-RAW data includes the first green color component Gr and the second green color component Gb. However, in the following description, the color components Gr and Gb will be regarded as the same color component. As illustrated in FIG. 5, the noise reduction unit 50 includes a first color component division unit 61, a pre-filtering unit 62 (first noise reduction processing means), a second color component division unit 63, a signal classification unit 64, a processing unit 65 (image noise reduction means) and a synthesizing unit (combining unit) 66. The first color component division unit 61 divides the input CCD-RAW data (R, C and B) into color components of R, G and B and obtains color component images R, G and B. The pre-filtering unit 62 performs pre-filtering processing (first noise reduction processing) on the CCD-RAW data (R, G and B). The second color component division unit 63 divides the CCD-RAW data after pre-filtering processing into color components of R, G and B and obtains color component images RL, CL and BL. The signal classification unit 64 performs signal classification processing, which will be described later, on the color component images RL, GL and BL. The processing unit 65 performs noise reduction processing on the color component images R, G and B based on the classification result obtained by the signal classification unit 64 and obtains color component images Rs, Gs and Bs on which noise reduction processing has been performed. The synthesizing unit 66 generates CCD-RAW data (CCD-RAW') on which noise reduction processing has been performed from the color component images Rs, Gs and Bs.

Next, the functions of the first color component division unit 61, the pre-filtering unit 62, the second color component division unit 63, the signal classification unit 64 and the processing unit 65 will be described with reference to the flowchart illustrated in FIG. 6. When the actual imaging is performed as described above and the CCD-RAW data (R, G and B) is input to the noise reduction unit 50 of the image processing unit 32, processing starts. First, the first color component division unit 61 divides the CCD-RAW data into color components of R, G and R and obtains color component images R, G and B (step ST1). Meanwhile, the pre-filtering unit 62 performs pre-filtering processing on the CCD-RAW data (R, G and B) (step ST2).

In the pre-filtering processing, filtering processing is performed on a target pixel, which is a target (object) of processing, and pixels in the vicinity of the target pixel (pixels surrounding the target pixel) by using a low-pass filter. The pre-filtering processing is performed only based on the arrangement of pixels represented by the CCD-RAW data (R, G and B). In other words, in the pre-filtering processing, the color distribution of the pixels is not considered. As the low-pass filter, a low-pass filter that obtains an average value or a weighted average value of the signal value of the target pixel, which is a pixel to be processed, and the signal values of four pixels in the vicinity of the target pixel, may be used, for example.

When the CCD 18 has array structure of honeycomb arrangement as illustrated in FIG. 2, if the color component of the target pixel is G, pre-filtering processing is performed by using the signal values of pixels of the color component B and the signal values of pixels of the color component R. As illustrated in FIGS. 7A and 7B, the pixels of the color component B and the pixels of the color component R located at the upper-right, lower-right, lower-left and upper-left positions of the target pixel are used. Further, if the color component of the target pixel is R or B, pre-filtering processing is performed by using the signal values of pixels of the color component G. In that case, as illustrated in FIGS. 7C and 7D, the pixels of the color component G located at the upper-right, lower-right, lower-left and upper-left positions of the target pixel are used.

Meanwhile, when the CCD 18 has array structure of Bayer arrangement as illustrated in FIG. 3, if the color component of the target pixel is G, pre-filtering processing is performed by using the signal values of pixels of the color component B and the signal values of pixels of the color component R. As illustrated in FIGS. 8A and 8B, the pixels of the color component B and the pixels of the color component R located at the upper, lower, right and left positions of the target pixel are used. Further, if the color component of the target pixel is R or B, pre-filtering processing is performed by using the signal values of pixels of the color component G. In that case, as illustrated in FIGS. 8C and 8D, the pixels of the color component G located at the upper, lower, right and left positions of the target pixel are used.

The pre-filtering processing performed when the CCD 18 has honeycomb arrangement is represented by the following equations (1) through (3). Further, the pre-filtering processing performed when the CCD 18 has Bayer arrangement is represented by the following equations (4) through (6). In the equations (1) through (6), "(0,0)" represents the coordinate of a target pixel and "(i,j)" represents the coordinates of pixels in the vicinity of the target pixel (i, j=−1 through 1, "i" represents the horizontal direction and "j" represents the vertical direction). Further, value a is a filter coefficient of the low-pass filter. Further, the equation (2) corresponds to the processing illustrated in FIG. 7B and the equation (5) corresponds to the processing illustrated in FIG. 8B.

$$RL_{0,0}=(a_{-1,-1}*G_{-1,-1}+a_{-1,1}*G_{-1,1}+a_{1,-1}*G_{1,-1}+a_{1,1}*G_{1,1}+A_{0,0}*R_{0,0})/(a_{-1,-1}+a_{-1,1}+a_{1,-1}+a_{1,1}+a_{0,0}) \quad (1)$$

$$BL_{0,0}=(a_{-1,-1}*R_{-1,-1}+a_{-1,1}*B_{-1,1}+a_{1,-1}*B_{1,-1}+a_{1,1}*R_{1,1}+a_{0,0}*G_{0,0})/(a_{-1,-1}+a_{-1,1}+a_{1,-1}+a_{1,1}+a_{0,0}) \quad (2)$$

$$BL_{0,0}=(a_{-1,-1}*G_{-1,-1}+a_{-1,1}*G_{-1,1}+a_{1,-1}*G_{1,-1}+a_{1,1}*G_{1,1}+a_{0,0}*B_{0,0})/(a_{-1,-1}+a_{-1,1}+a_{1,-1}+a_{1,1}+a_{0,0}) \quad (3)$$

$$RL_{0,0}=(a_{-1,0}*G_{-1,0}+a_{0,-1}*G_{0,-1}+a_{1,0}*G_{1,0}+a_{0,1}*G_{0,1}+a_{0,0}*R_{0,0})/(a_{-1,0}+a_{0,-1}+a_{1,0}+a_{0,1}+a_{0,0}) \quad (4)$$

$$GL_{0,0}=(a_{-1,0}*B_{-1,0}+a_{0,-1}*R_{0,-1}+a_{1,0}*B_{1,0}+a_{0,1}*R_{0,1}+a_{0,0}*G_{0,0})/(a_{-1,0}+a_{0,-1}+a_{1,0}+a_{0,1}+a_{0,0}) \quad (5)$$

$$BL_{0,0}=(a_{-1,0}*G_{-1,0}+a_{0,-1}*G_{0,-1}+a_{1,0}*G_{1,0}+a_{0,1}*G_{0,1}+a_{0,0}*B_{0,0})/(a_{-1,0}+a_{0,-1}+a_{1,0}+a_{0,1}+a_{0,0}) \quad (6)$$

It is possible to reduce random noise contained in the CCD-RAW data to a certain extent by performing the aforementioned pre-filtering processing.

In the present embodiment, the pre-filtering processing is performed on the CCD-RAW data before performing color interpolation processing. The pre-filtering is performed in such a manner because in the CCD-RAW data before color interpolation processing, noise contained in the CCD-RAW data maintains a spatial random characteristic. In other words, if color interpolation processing is performed on the CCD-RAW data, the random characteristic of noise contained in the CCD-RAW data is lost in each of the color component images. Therefore, if pre-filtering is performed on the CCD-RAW data after color interpolation processing, it is impossible to reduce noise. Hence, in the present embodiment, the pre-filtering processing is performed on the CCD-RAW data before performing color interpolation processing.

Then, the second color component division unit 3 divides the CCD-RAW data (RL, GL and BL) into color component images RL, CL and BL including color components of R, G and B respectively (step ST3).

FIG. 9 is a diagram for explaining processing for dividing data into color components. In the present embodiment, the CCD-RAW data (RL, GL and BL) is divided into color components of respective colors so that each set of divided data represents an image including only one of color components of R, G and B, respectively. The arrangement of pixels in an image represented by the CCD-RAW data is divided in such a manner and color component images RL, GL and BL are obtained.

Then, the signal classification unit 64 performs signal classification processing. In the signal classification processing, a noise reduction processing target area BA is set in each of the color component images RL, GL and BL. The noise reduction processing target area BA includes 9×9=81 pixels (9 pixels in the column direction and 9 pixels in the row direction). Then, all the pixels in the noise reduction processing target area BA are classified, based on the signal value of each of the pixels, into a flat portion (a uniform portion or an even portion), in which a change in signal values is small, and a signal portion, in which a change in signal values is large. Further, it is not necessary that the size of the processing target area BA is 81 pixels.

Figure 10:
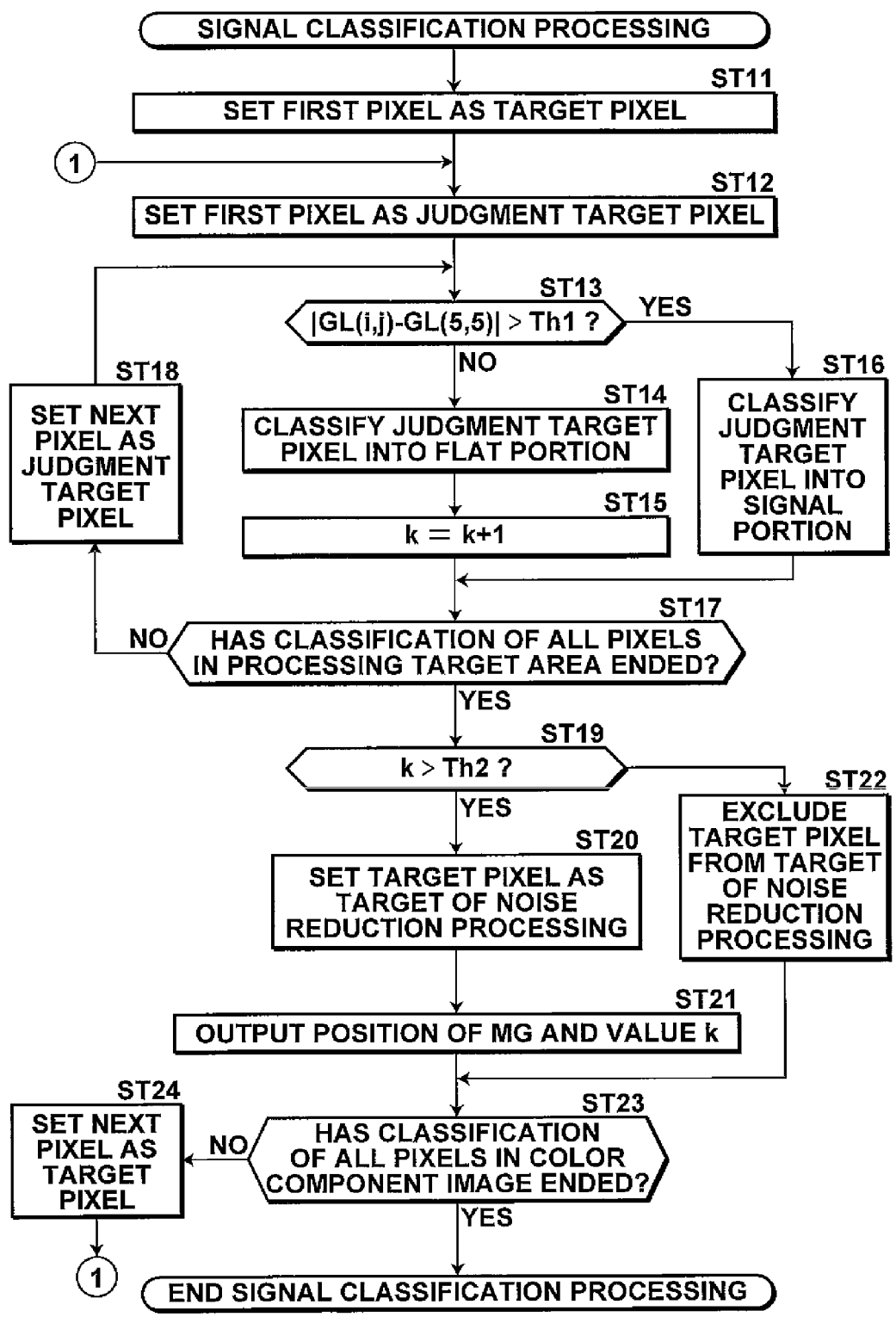
FIG. 10 is a flowchart illustrating signal classification processing.

FIG. 10 is a flowchart illustrating processing for classifying signals. The signal classification processing performed on each of the color component images RL, GL and BL is the same. Therefore, only the processing on the green color component image GL will be described. First, a first pixel is set as a target pixel, which is a target of signal classification processing (step ST11). Then, in a processing target area BA including 9×9=81 pixels, the center of which is the target pixel, a pixel (judgment target pixel) (i,j) in the processing target area BA is set as the first pixel (step ST12). Then, judgment is made as to whether the absolute value |GL(i,j)−GL(5,5)| of a difference between the signal value GL(i,j) of the judgment target pixel (i,j) and the signal value GL(5,5) of the target pixel (5,5) at the center of the processing target area BA exceeds a predetermined threshold value Th1 or judging the area (step ST13). The coordinate of the pixel at the upper left corner of the processing target area BA is (1,1). Further, a ratio of the signal value GL(i,j) to the signal value GL(5,5) may be used instead of the absolute value |GL(i,j)−GL(5,5)| of the difference.

If the judgment in step ST13 is NO, it is judged that the judgment target pixel (i,j) and the target pixel (5,5) have a correlation with each other. Therefore, the judgment target pixel (i,j) is classified into the group of the flat portion, in which a change in signal values is small (step ST14). Then, the number k of pixels classified into the group of the flat portion is increased by one (step ST15). The initial value of k is 1 because the classification is performed based on the target pixel (5,5).

Meanwhile, if the judgment in step ST13 is YES, it is judged that the judgment target pixel (i,j) and the target pixel (5,5) at the center have no correlation with each other. Therefore, the judgment target pixel (i,j) is classified into the signal portion, in which a change in signal values from the target pixel (5,5) is large, instead of the group of the flat portion (step ST16).

After steps ST15 and ST16, judgment is made as to whether classification has been performed on all of the pixels in the processing target area BA (step ST17). If the judgment in step ST17 is NO, the next pixel is set as the judgment target pixel (step ST18). Then, processing goes back to step ST13 and processing from ST13 is repeated.

Accordingly, the processing target area BA of 9×9=81 pixels, illustrated in FIG. 11A, is classified, based on the target pixel (illustrated as a shaded pixel) at the center of the processing target area BA, into a flat portion and a signal portion, as illustrated in FIG. 11B. The signal portion is the portion other than the flat portion. In FIG. 11B, the flat portion is an area enclosed by a bold line and the number of pixels in the flat portion is 56. Further, in the color component image GL and the color component image G, a reference sign MG is used to represent a pixel that has been classified into the flat portion so as to indicate that the pixel is included in the flat portion. Further, in the color component images RL and BL and the color component images R and B, reference signs MR and MB are used for pixels classified into the flat portion. Further, these reference signs MR, MG and MB are used to indicate the signal values of the pixels that have been classified into the flat portion.

Then, if the judgment in step ST17 is YES, judgment is made as to whether the number k of pixels MS in the processing target area BA, the pixels MG having been classified into the group of the flat portion, exceeds a predetermined threshold value Th2 for judging processing (step ST19). It the judgment in step ST19 is YES, the target pixel is set as a target of noise reduction processing that will be performed in a later stage (step ST20). Then, the position of the pixel MG in the flat portion of the processing target area BA and value k are output (step ST21). If the judgment in step ST19 is NO, the target pixel is excluded from the noise reduction processing target (step ST22).

If a change in signal values in the vicinity of the target pixel in the processing target area BA is small, the value k becomes relatively large and exceeds the threshold value Th2. Therefore, there is a high probability that the target pixel is present in the flat portion, in which noise is easily noticeable. Hence, the target pixel is set as the target of noise reduction processing. In contrast, if an edge or fine patterns are present in the vicinity of the target pixel in the processing target area BA, a change in the signal values becomes large. Therefore, the value of k becomes relatively small and becomes less than or equal to the threshold value Th2. In such a case, if noise reduction processing is performed on the target pixel, the edge and the fine patterns are blurred. Therefore, the target pixel is excluded from the noise reduction processing target.

After steps ST21 and ST22, judgment is made as to whether all of the pixels in the color component image GL have been classified (step ST23). If the judgment in step ST23 is NO, the next pixel is set as the target pixel (step ST24). Then, processing goes back to step ST12 and processing from step ST12 is repeated. If step ST23 is YES, the signal classification processing ends.

Figure 6:
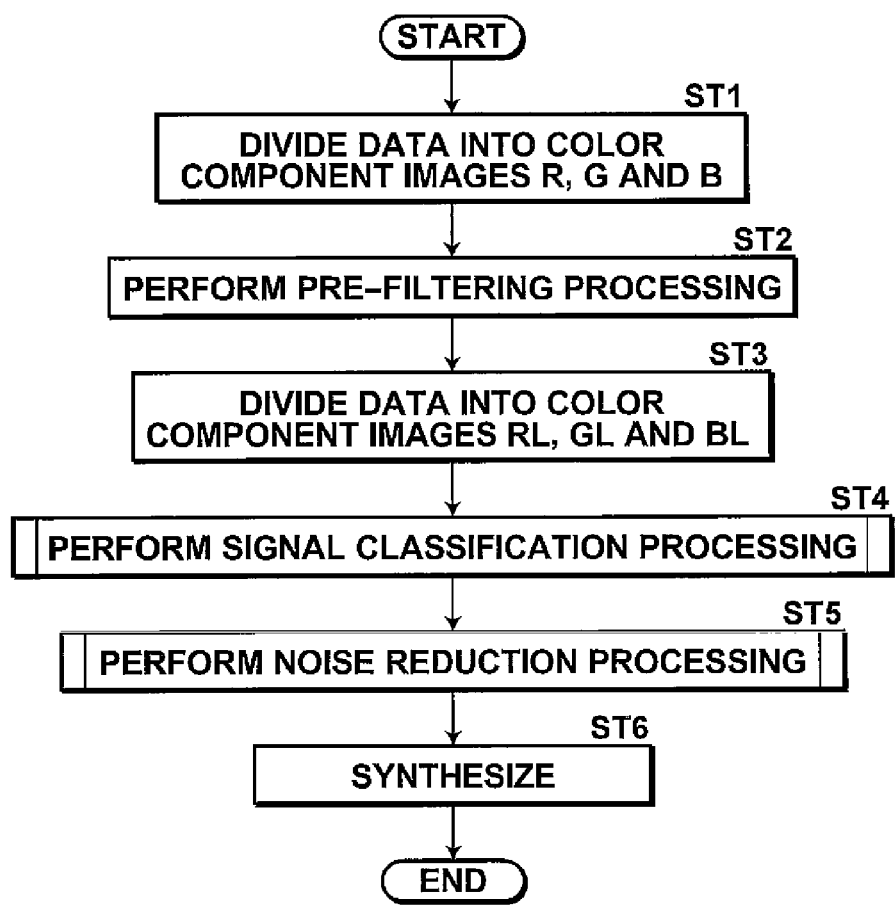
FIG. 6 is a flowchart illustrating processing performed in an embodiment of the present invention.
Figure 12:
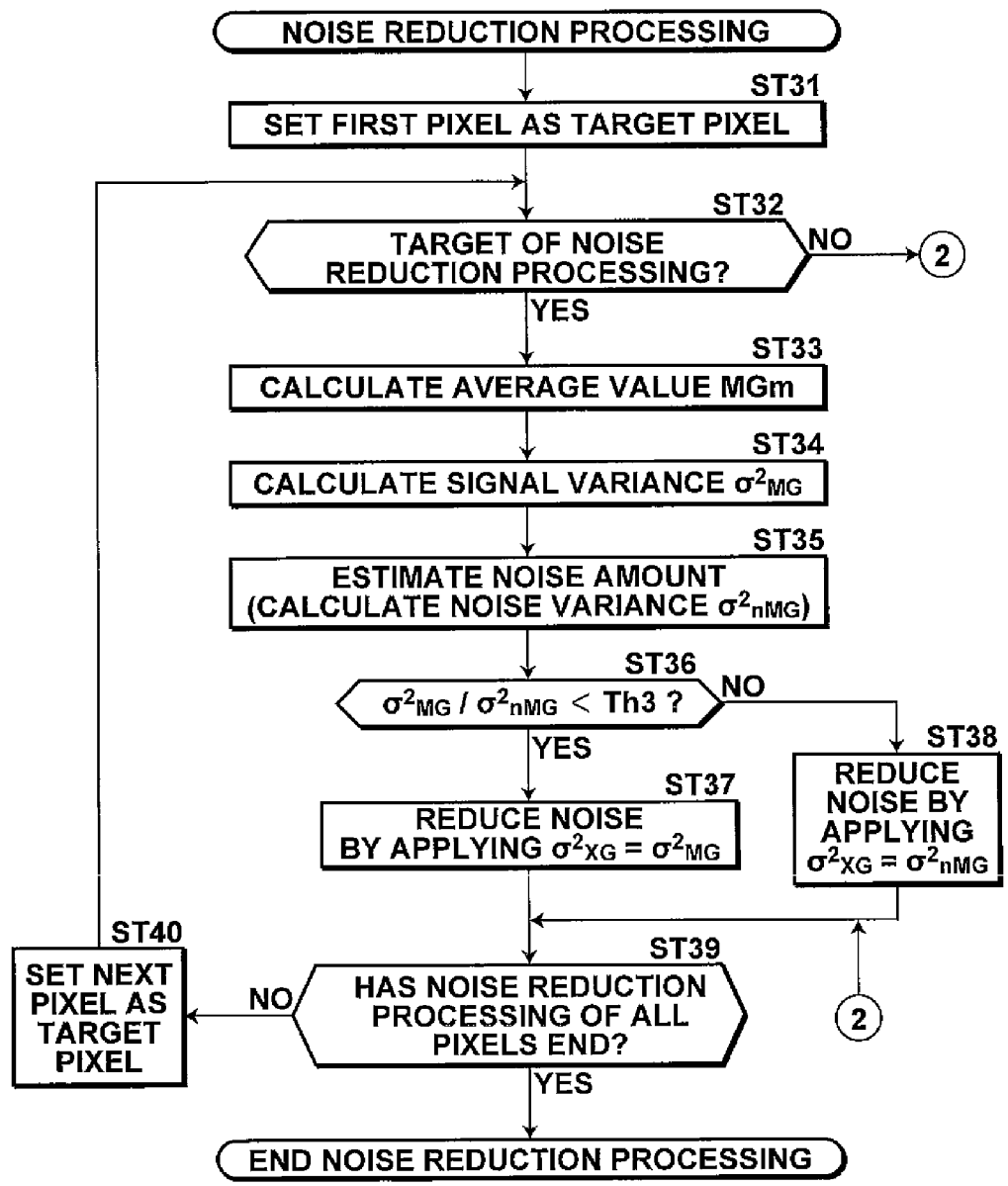
FIG. 12 is a flowchart illustrating noise reduction processing.

Then, processing returns to the processing illustrated in FIG. 6. After the signal classification processing, the processing unit 65 performs noise reduction processing on the color component images R, G and B (step ST5). FIG. 12 is a flowchart of noise reduction processing. Since the same processing is performed on the color component images R, G and B, only the noise reduction processing on the green color component image G will be described. The first pixel is set as the target pixel, which is the target of noise reduction processing (step ST31). Then, judgment is made as to whether the target pixel has been set as the noise reduction processing target in the aforementioned signal classification processing (step ST32). If the judgment in step ST32 is No, processing goes to step ST39, which will be described later.

If the judgment in step ST32 is YES, an average value MGm of the signal values of pixels MG that have been classified into the flat portion in a processing target area BA that has a size similar to that of the processing target area BA of signal classification processing is calculated by using the following equations (7) and (8) (step ST33). Further, a variance $\sigma^2_{MG}$ (a statistic representing noise) representing a noise amount based on the signal values in the processing target area BA is calculated (step ST34).

$$MG_m = \frac{1}{\sum\sum wij} \sum \sum wij \cdot MG(i,j) \quad (7)$$

$$\sigma^2_{MG} = \frac{1}{k-1} \sum \sum (MG(i,j) - MG_m) \quad (8)$$

In the equation (7), value wij is a weighting coefficient with respect to a signal value MG(i,j). Further, in the equations (7) and (8), Σ indicates that all of k number of signal values MG(i,j) are added together. Further, what is calculated by using the equations (7) and (8) is not the average value and the variance of the color component image GL but the average value and the variance of the color component image G.

Meanwhile, the processing unit 65 estimates a noise amount in the processing target area BA by using the average value MGm obtained by calculation in step ST33 (step ST35). Specifically, a noise variance $\sigma^2_{nMG}$, which represents the estimated noise amount, is calculated by using the following equation (9). In the equation (9), values A, B and C are coefficients determined by dark noise, light shot noise and fixed pattern noise, which are inherent in the CCD 18. Further, in the equation (9), "offset" is an offset value of the CCD 18. A variance $\sigma^2_{MG}$ calculated by using the equation (8) is referred to as a signal variance so as to be distinguished from the noise variance $\sigma^2_{nMG}$ obtained by using the equation (9).

$$\sigma^2_{nMG} = A \cdot (MG_m - \text{offset})^2 + B \cdot (MG_m - \text{offset}) + C \quad (9)$$

Then, the processing unit 65 judges whether the ratio $\sigma^2_{MG}/\sigma^2_{nMG}$, which is the ratio of the noise variance $\sigma^2_{nMG}$ to the signal variance $\sigma^2_{MG}$, is less than a predetermined threshold value Th3 (step ST36). If the aforementioned signal classification processing has been appropriately performed, the signal variance $\sigma^2_{MG}$ and the noise variance $\sigma^2_{nMG}$ are substantially the same. Therefore, the ratio $\sigma^2_{MG}/\sigma^2_{nMG}$ becomes close to 1. Meanwhile, in the aforementioned signal classification processing, the color component images RL, GL and BL, the noise of which has been reduced to a certain degree by the pre-filtering processing, are used. Therefore, even if a pixel is classified into the flat portion in the signal classification processing using the color component images RL, Gl and BL, there is a probability that the color component images R, G and B, on which pre-filtering processing has not been performed, and which are the targets of noise reduction processing, include an edge or fine patterns. In such a case, the signal variance $\sigma^2_{MG}$ exceeds the noise variance $\sigma^2_{nMG}$. Therefore, the ratio $\sigma^2_{MG}/\sigma^2_{nMG}$ becomes large.

Therefore, if the judgment in step ST36 is YES, it can be regarded that the target pixel is present in the flat portion. Therefore, in the following equation (10), the noise of the target pixel is reduced by applying "$\sigma^2_{xG}$=signal variance $\sigma^2_{MG}$" (step ST37). If the judgment in step ST36 is NO, the probability that the target pixel is present in the signal portion is high. Therefore, in the following equation (10), the noise of the target pixel is reduced by applying "$\tau^2_{xG}$=noise variance $\sigma^2_{nMG}$" (step ST38). In the equation (10), α is a coefficient for determining the degree of noise reduction and 0≤α≤1.

$$Gs = MG_m + \left( \frac{\sigma^2_{MG} - \alpha \cdot \sigma^2_{xG}}{\sigma^2_{MG}} \right) \cdot (G - MG_m) \qquad (10)$$

In the equation (10), the signal value of the pixel in the processing target area BA is shifted to a value at the origin of a color space that has a G color component in its coordinate system by subtracting the average value MGm from the pixel value G of the target pixel. Then, the signal value of the shifted target pixel is multiplied by $(\sigma^2_{MG}-\alpha \cdot \sigma^2_{xG})/\sigma^2_{MG}$. Then, the average value MGm is added to the value obtained by the multiplication. Accordingly, the signal value of the target pixel returns to a level corresponding to the original signal value. The value of $(\sigma^2_{MG}-\alpha \cdot \sigma^2_{xG})/\sigma^2_{MG}$ is a value between 0 and 1. Therefore, the pixel value Gs of the processed target pixel is a value between the pixel value G before processing and the average value MGm.

Therefore, for example, when α=1, if the ratio $\sigma^2_{MG}/\sigma^2_{nMG}$ is less than the predetermined threshold value Th3, "$\sigma^2_{xG}$=signal variance $\sigma^2_{MG}$". Further, $(\sigma^2_{MG}-\alpha \cdot \sigma^2_{xG})/\sigma^2_{MG}$ is 0. Therefore, the signal value Gs of the processed target pixel becomes the average value MGm. If the ratio $\sigma^2_{MG}/\sigma^2_{nMG}$ is greater than or equal to the predetermined threshold value Th3, "$\sigma^2_{xG}$=noise variance $\sigma^2_{nMG}$" and "$\sigma^2_{MG}>>\sigma^2_{nMG}$". Therefore, the value of $(\sigma^2_{MG}-\alpha \cdot \sigma^2_{xG})/\sigma^2_{MG}$ becomes even closer to 1. Hence, the signal value Cs of the processed target pixel becomes even closer to the signal value C before processing.

Then, judgment is made as to whether noise reduction processing on all of the pixels has been completed (step ST39). If the judgment in step ST39 is NO, the next pixel is set as the processing target (step ST40). Then, processing goes back to step ST32 and processing from step ST32 is repeated. If the judgment in step ST39 is YES, the noise reduction processing ends.

Processing goes back to the processing illustrated in FIG. 6. The synthesizing unit 66 synthesizes (combines) processed color component images Rs, Gs and Bs and generates processed CCD-PAW data (CCD-RAW') (step ST6). Then, the noise reduction processing ends. The CCD-RAW data after noise reduction processing is further processed by the offset correction unit 51, the gain correction unit 52, the color correction unit 53, the gamma correction unit 54 and the color interpolation processing unit 55. The offset correction unit 51 performs offset correction processing and the gain correction unit 52 performs gain correction processing. The color correction unit 53 performs color correction processing and the gamma correction unit 54 performs gamma correction processing. The color interpolation processing unit 55 performs color interpolation processing to interpolate each color component to the CCD-RAW data. Then, the YC processing unit 56 converts the CCD-RAW data, into which the color components have been interpolated, into Y data, which is a luminance signal, and YC data including Cb data and Cr data. The Cb data is blue chrominance signal and the Cr data is red chrominance signal.

Then, the compression/decompression processing unit 33 performs compression processing, by using a compression format, such as JPEG, on the CCD-RAW data that has been processed by the image processing unit 32 and generates an image file. The generated image file is recorded in the recording medium 35 by the medium control unit 34.

As described above, in the present embodiment, when signal classification processing is performed, pre-filtering processing is performed on the CCD-RAW data (R, G and B) to reduce noise to a certain extent. It is not necessary that the pre-filtering processing is performed. The pixels in the processing target area BA may be classified into a flat portion and a signal portion without performing pre-filtering. However, it a CCD-RAW image represented by the CCD-RAW data includes much noise, when the signal value of the target pixel, which is the target of processing in each of the color component images R, G and B, and the signal value of each pixel in the processing target area BA are compared with each other, a difference between the signal values is not present in the comparison result because of the influence of the noise. Therefore, it is impossible to accurately classify the pixels in the processing target area BA into the flat portion and the signal portion. Particularly, a CCD-RAW image that has been obtained by high sensitivity imaging includes an extremely large amount of noise. Therefore, it is even more difficult to classify the pixels into the flat portion and the signal portion.

In the present embodiment, pre-filtering processing is performed on the CCD-RAW data. Therefore, even if the CCD-RAW image includes a large amount of noise as in the case of high sensitivity imaging, it is possible to reduce noise contained in the color component images R, G and B obtained from the CCD-RAW data. Hence, it is possible to accurately classify the pixels in the processing target area BA into the flat portion and the signal portion without being influenced by the noise.

Further, since the pre-filtering processing is performed on the CCD-RAW data only based on the arrangement of pixels. In other words, the distribution of the color component is not taken into consideration in the pre-filtering processing. Therefore, noise is substantially reduced in a band that is higher than or equal to Nyquist frequency of each of color components included in the image. Therefore, although some blur (unsharpness) is generated in the image on which pre-filtering processing has been performed, the blur is reduced in the color component images RL, GL and BL that are obtained by dividing the image into each color component. Hence, it is possible to classify, based on the result of comparison, the pixels in the processing target area BA into the flat portion and the signal portion without being influenced by the blur.

In the flat portion of the image, a change in signals is zero or extremely small. Therefore, if the target pixel is classified into the flat portion, the signal variance $\sigma^2_{MG}$ indicates noise variance. Therefore, ideally, the signal variance $\sigma^2_{MG}$ and the noise variance $\sigma^2_{nMG}$ become the same value. However, since the noise variance $\sigma^2_{nMG}$ is the value of the estimated noise amount obtained by using the equation (9). Meanwhile, the signal variance $\sigma^2_{MG}$ is a variance obtained by calculation in a limited area of the image by using an actual signal value. Hence, there are cases in which the signal variance $\sigma^2_{MG}$ and the noise variance $\sigma^2_{nMG}$ are not the same at some portion of an image. In such a case, if noise reduction processing is performed by performing an operation of the equation (10) by using only the noise variance $\sigma^2_{nMG}$, a spot may be generated in the flat portion of the image by being influenced by the portion in which the signal variance $\sigma^2_{MG}$ and the noise variance $\sigma^2_{nMG}$ are not same.

Meanwhile, in the aforementioned signal classification processing, the color component images RL, GL and BL, the noise of which has been reduced to a certain extent by the pre-filtering processing, are used. Therefore, even if the target pixel is classified into the flat portion in signal classification processing, there is a probability that the color component images R, C and B, which are targets of noise reduction processing, and on which pre-filtering processing has not been performed, include an edge or fine patterns. In such a case, the value of the signal variance $\sigma^2_{MG}$ becomes large. Therefore, if the operation of the equation (10) is performed by using only the signal variance $\sigma^2_{MG}$, the edge and the fine patterns may be blurred.

If the signal variance $\sigma^2_{MG}$ and the noise variance $\sigma^2_{nMG}$ are substantially the same, in other words, if the estimated noise amount and the actually measured noise amount are substantially the same, the ratio $\sigma^2_{MG}/\sigma^2_{nMG}$ becomes close to 1. In this case, in the present embodiment, it is regarded that the target pixel is present in the flat portion and the operation of the equation (10) is performed by using the measured noise amount, namely the signal variance $\sigma^2_{MG}$. Therefore, it is possible to appropriately reduce noise in the flat portion without generating a spot in the flat portion. Meanwhile, if the noise is reduced too much by the influence of the pre-filtering processing, the signal variance $\sigma^2_{MG}$ becomes higher than the noise variance $\sigma^2_{nMG}$ and the ratio $\sigma^2_{MG}/\sigma^2_{nMG}$ becomes higher. In this case, the ratio $\sigma^2_{MG}/\sigma^2_{nMG}$, which is the ratio of the signal variance $\sigma^2_{MG}$ to the noise variance $\sigma^2_{nMG}$, becomes greater than or equal to the threshold value Th3. Therefore, it can be regarded that the target pixel is present in the signal portion. Hence, "$\sigma^2_{xG}$=noise variance $\sigma^2_{nMG}$" is applied to the equation (10). Accordingly, it becomes possible to prevent the edge and the fine patterns from blurring. Hence, it is possible to perform noise reduction processing without blurring the edge and the fine patterns and without generating a spot in the flat portion.

Further, the pixels that have been classified into the signal portion in signal classification processing are excluded from the targets of noise reduction processing. Therefore, it is possible to reduce noise without blurring the edge and the fine patterns.

Further, in the aforementioned embodiment, judgment is made as to whether the absolute value |CL(i,j)−GL(5,5)| of a difference between the signal value GL(i,j) of the judgment target pixel (i,j) and the signal value GL(5,5) of the target pixel (5,5) at the center exceeds the predetermined threshold value Th1. Alternatively, for example, two threshold values Th1 and Th1' (Th1>Th1') may be set and judgment may be made as to whether the absolute value |GL(i,j)−GL(5,5)| of the difference is less than the threshold value Th1', whether the absolute value |GL(i,j)−GL(5,5)| of the difference is greater than or equal to the threshold value Th1' and less than the threshold value Th1, and whether the absolute value |GL(i,j)−GL(5,5)| of the difference exceeds the threshold value Th1. Then, the judgment target pixel (i,j) may be classified into a plurality of groups. Specifically, if |GL(i,j)−GL(5,5)|<Th1|, the judgment target pixel (i,j) is classified into the group of the flat portion. If Th1'≤|GL(i,j)−GL(5,5)|<Th1, the judgment target pixel (i,j) is classified into a group (intermediate group) between the flat portion and the signal portion. If Th1<|GL(i,j)−GL(5,5)|, the judgment target pixel (i,j) is classified into a group of the signal portion. In this case, with respect to the number of pixels classified into the intermediate group between the flat portion and the signal portion, the value k should be regarded as k=½. Then, ½ of the number of pixels classified into the intermediate group should be added to the number k of pixels classified into the flat portion.

Further, in the aforementioned embodiment, after all the pixels in the color component images RL, GL and BL are classified by the signal classification unit 64, noise reduction processing is performed by the processing unit 65. Alternatively, the result of signal classification processing by the signal classification unit 64 may be sequentially output and noise reduction processing may be sequentially performed on the target pixels by the processing unit 65.

Further, in the aforementioned embodiment, the noise reduction processing is performed based on the classification result of signal classification processing. However, it is not necessary that the signal classification processing is performed. The noise reduction processing may be performed on the color component images R, G and B by the processing unit 65 without performing the signal classification processing. In this case, the average value MGm, the signal variance $\sigma^2_{MG}$, and the noise variance $\sigma^2_{nMG}$ should be obtained by using the signal values of all of the pixels in the processing target area BA.

Further, in the aforementioned embodiment, in the noise reduction processing, which of the signal variance $\sigma^2_{MG}$ and the noise variance $\sigma^2_{nMG}$ to use in the equation (10) is determined based on the ratio $\sigma^2_{MG}/\sigma^2_{nMG}$, which is the ratio of the signal variance $\sigma^2_{MG}$ to the noise variance $\sigma^2_{nMG}$. Alternatively, which of the signal variance $\sigma^2_{MG}$ and the noise variance $\sigma^2_{nMG}$ to use in the equation (10) may be determined based on the difference between the signal variance $\sigma^2_{MG}$ and the noise variance $\sigma^2_{nMG}$ or the absolute value of the difference.

So far, the noise reduction apparatus according to an embodiment of the present invention has been applied to a digital camera. Alternatively, a noise reduction apparatus that performs similar noise reduction processing on CCD-RAW data obtained by the digital camera may be separately provided. Further, a program for causing a computer to execute the processing illustrated in FIGS. 6, 10 and 12 by causing the computer to function as means corresponding to the pre-filtering unit 62, the color component division unit 73, the signal classification unit 64 and the processing unit 65 is another embodiment of the present invention. Further, a computer-readable recording medium having stored thereon the program is still another embodiment of the present invention.

What is claimed is:

1. A noise reduction apparatus comprising:
   an image noise reduction means for reducing noise in an image, wherein the image noise reduction means includes an operation means and a judgment means, and
   wherein the operation means shifts the level of the signal value of a target pixel, which is a target of processing in the image, so that an average value of the signal value of the target pixel and the signal values of pixels in a predetermined area in the vicinity of the target pixel becomes a value at the origin of a color space of each of a plurality of color components, performs an operation for noise reduction processing on the target pixel, the level of the signal value of which has been shifted, and restores the level of the signal value of the target pixel, the noise of which has been reduced, based on the amount of the shifted level, and
   wherein the judgment means estimates a noise amount of the target pixel based on the signal value of the target pixel, the signal values of the pixels in the predetermined area, and a noise property of the imaging device which obtains the image, calculates a statistic representing the noise of the target pixel based on the signal value of the target pixel and the signal values of the pixels in the predetermined area, compares the estimated noise amount and the statistic with each other, and determines, based on the result of comparison, which of the estimated noise amount and the statistic to use to perform the operation for noise reduction processing.

2. A noise reduction apparatus, as defined in claim 1, wherein the average value is an average value of the signal values of pixels that have been classified, based on a result of comparison between the signal value of the target pixel and the signal values of the pixels in the predetermined area in the vicinity of the target pixel, into a group of pixels, a change in the signal values of which is relatively small.

3. The noise reduction apparatus as defined in claim 1, wherein the judgment means calculates an average value $MG_m$ of the signal values of pixels in the predetermined area according to the equation $$MG_m = \frac{1}{\sum\sum wij} \sum\sum wij \cdot MG(i, j),$$

where wij is a weighting coefficient with respect to a signal value MG(i,j) of respective pixels in the predetermined area that have been classified into a flat portion of the predetermined area, and
calculates the statistic $\sigma^2_{mG}$ representing the noise of the target pixel based on the signal value of the target pixel and the signal values of the pixels in the predetermined area according to the equation $$\sigma^2_{MG} = \frac{1}{k-1} \sum\sum (MG(i, j), -MG_m),$$

where k is the number of pixels in the predetermined area that have been classified into the flat portion.

4. The noise reduction apparatus as defined in claim 3, wherein the judgment means estimates the noise amount of the target pixel by calculating a noise variance $\sigma^2_{nMG}$ representing the estimated noise amount according to the equation $$\sigma^2_n MG = A \cdot (MG_m - \text{offset})^2 + B \cdot (MG_m - \text{offset}) + C,$$

where A, B, and C are coefficients determined by dark noise, light shot noise, and fixed pattern noise of an imaging device which obtained the image, and "offset" is an offset value of the imaging device.

5. The noise reduction apparatus as defined in claim 3, wherein the judgment means classifies pixels in the predetermined area into the flat portion of the predetermined area when a difference between the signal value of the pixel and the signal value of the target pixel is below a predetermined threshold.

6. The noise reduction apparatus as defined in claim 1, wherein the judgment means determines which of the estimated noise amount and the statistic to use to perform the operation for noise reduction processing by judging whether a ratio of the estimated noise amount to the statistic is less than a predetermined threshold value.

7. The noise reduction apparatus as defined in claim 6, wherein
when the ratio is less than the predetermined threshold value, the statistic is used to perform the operation for noise reduction processing, and
when the ratio is not less than the predetermined threshold value, the estimated noise amount is used to perform the operation for noise reduction processing.

8. A noise reduction method for reducing noise in an image, the method comprising:
shifting the level of the signal value of a target pixel, which is a target of processing in the image, so that an average value of the signal value of the target pixel and the signal values of pixels in a predetermined area in the vicinity of the target pixel becomes a value at the origin of a color space of each of a plurality of color components;
performing an operation for noise reduction processing on the target pixel, the level of the signal value of which has been shifted; and
restoring the level of the signal value of the target pixel, the noise of which has been reduced, based on the amount of the shifted level, wherein
when these steps are performed, a noise amount of the target pixel is estimated pixel based on the signal value of the target pixel, the signal values of the pixels in the predetermined area, and a noise property of the imaging device which obtains the image, a statistic representing the noise of the target pixel is calculated based on the signal value of the target pixel and the signal values of the pixels in the predetermined area, the estimated noise amount and the statistic are compared with each other, and which of the estimated noise amount and the statistic to use to perform the operation for noise reduction processing is determined based on the result of comparison.

9. The noise reduction method as defined in claim 8, further comprising:
calculating an average value $MG_m$ of the signal values of pixels in the predetermined area according to the equation $$MG_m = \frac{1}{\sum\sum wij} \sum\sum wij \cdot MG(i, j),$$

where wij is a weighting coefficient with respect to a signal value MG(i,j) of respective pixels in the predetermined area that have been classified into a flat portion of the predetermined area, and
calculating the statistic $\sigma^2_{mG}$ representing the noise of the target pixel based on the signal value of the target pixel and the signal values of the pixels in the predetermined area according to the equation $$\sigma^2_{MG} = \frac{1}{k-1} \sum\sum (MG(i, j), -MG_m),$$

where k is the number of pixels in the predetermined area that have been classified into the flat portion.

10. The noise reduction method as defined in claim 9, further comprising:
estimating the noise amount of the target pixel by calculating a noise variance $\sigma^2_{nMG}$ representing the estimated noise amount according to the equation $$\sigma^2_n MG = A \cdot (MG_m - \text{offset})^2 + B \cdot (MG_m - \text{offset}) + C,$$

where A, B, and C are coefficients determined by dark noise, light shot noise, and fixed pattern noise of an imaging device which obtained the image, and "offset" is an offset value of the imaging device.

11. The noise reduction method as defined in claim 9, further comprising:
classifying pixels in the predetermined area into the flat portion of the predetermined area when a difference between the signal value of the pixel and the signal value of the target pixel is below a predetermined threshold.

12. The noise reduction method as defined in claim 8, wherein the determination of which of the estimated noise amount and the statistic to use to perform the operation for noise reduction processing is based on whether a ratio of the estimated noise amount to the statistic is less than a predetermined threshold value.

13. The noise reduction method as defined in claim 12, wherein
when the ratio is less than the predetermined threshold value, the statistic is used to perform the operation for noise reduction processing, and
when the ratio is not less than the predetermined threshold value, the estimated noise amount is used to perform the operation for noise reduction processing.

14. A non-transitory computer-readable recording medium having stored thereon a program that causes a computer to execute a noise reduction method for reducing noise of an image, the noise reduction method comprising the steps of:
shifting the level of the signal value of a target pixel, which is a target of processing in the image, so that an average value of the signal value of a target pixel and the signal values of pixels in a predetermined area in the vicinity of the target pixel becomes a value at the origin of a color space of each of a plurality of color components;
performing an operation for noise reduction processing on the target pixel, the level of the signal value of which has been shifted; and
restoring the level of the signal value of the target pixel, of which the noise has been reduced, based on the amount of the shifted level, wherein when these steps are performed, the program includes the procedures of:
estimating a noise amount of the target pixel based on the signal value of the target pixel, the signal values of the pixels in the predetermined area, and a noise property of the imaging device which obtains the image;
calculating, based on the signal value of the target pixel and the signal values of the pixels in the predetermined area in the vicinity of the target pixel, a statistic representing the noise of the target pixel;
comparing the estimated noise amount and the statistic with each other; and
determining, based on the result of comparison, which of the estimated noise amount and the statistic to use to perform the operation for noise reduction processing.

15. The non-transitory computer-readable medium as defined in claim 14, wherein the noise reduction method further comprises:
calculating an average value $MG_m$ of the signal values of pixels in the predetermined area according to the equation $$MG_m = \frac{1}{\sum\sum wij}\sum\sum wij \cdot MG(i, j),$$

where wij is a weighting coefficient with respect to a signal value $MG(i,j)$ of respective pixels in the predetermined area that have been classified into a flat portion of the predetermined area, and
calculating the statistic $\sigma^2_{mG}$ representing the noise of the target pixel based on the signal value of the target pixel and the signal values of the pixels in the predetermined area according to the equation $$\sigma^2_{MG} = \frac{1}{k-1}\sum\sum(MG(i, j), -MG_m),$$

where k is the number of pixels in the predetermined area that have been classified into the flat portion.

16. The non-transitory computer-readable medium as defined in claim 15, wherein the noise reduction method further comprises:
estimating the noise amount of the target pixel by calculating a noise variance $\sigma^2_{nMG}$ representing the estimated noise amount according to the equation $$\sigma^2_n MG = A \cdot (MG_m - \text{offset})^2 + B \cdot (MG_m - \text{offset}) + C,$$

where A, B, and C are coefficients determined by dark noise, light shot noise, and fixed pattern noise of an imaging device which obtained the image, and "offset" is an offset value of the imaging device.

17. The non-transitory computer-readable medium as defined in claim 15, wherein the noise reduction method further comprises:
classifying pixels in the predetermined area into the flat portion of the predetermined area when a difference between the signal value of the pixel and the signal value of the target pixel is below a predetermined threshold.

18. The non-transitory computer-readable recording medium storing the program as defined in claim 14, wherein determining which of the estimated noise amount and the statistic to use to perform the operation for noise reduction processing is based on whether a ratio of the estimated noise amount to the statistic is less than a predetermined threshold value.

19. The non-transitory computer-readable recording medium storing the program as defined in claim 18, wherein
when the ratio is less than the predetermined threshold value, the statistic is used to perform the operation for noise reduction processing, and
when the ratio is not less than the predetermined threshold value, the estimated noise amount is used to perform the operation for noise reduction processing.

* * * * *